United States Patent
Sadler et al.

(10) Patent No.: US 9,527,028 B2
(45) Date of Patent: Dec. 27, 2016

(54) MOVING BED TEMPERATURE SWING ADSORPTION PROCESS

(71) Applicant: UOP LLC, Des Plaines, IL (US)

(72) Inventors: Clayton C. Sadler, Arlington Heights, IL (US); David A. Wegerer, Lisle, IL (US); Matthew Lippmann, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 76 days.

(21) Appl. No.: 14/575,563

(22) Filed: Dec. 18, 2014

(65) Prior Publication Data

US 2016/0175760 A1    Jun. 23, 2016

(51) Int. Cl.
*B01D 53/08*    (2006.01)
*B01D 53/04*    (2006.01)

(52) U.S. Cl.
CPC ....... *B01D 53/0462* (2013.01); *B01D 53/0438* (2013.01); *B01D 53/0454* (2013.01); *B01D 53/08* (2013.01); *B01D 2253/104* (2013.01); *B01D 2253/108* (2013.01)

(58) Field of Classification Search
CPC ............ B01D 53/0462; B01D 53/0438; B01D 53/0454; B01D 53/06; B01D 53/08; B01D 2253/104; B01D 2253/108
USPC ...................... 95/107, 110–112, 148; 96/150
See application file for complete search history.

(56) References Cited

U.S. PATENT DOCUMENTS

| | | | | |
|---|---|---|---|---|
| 2,684,729 A * | 7/1954 | Berg | ...................... | B01D 53/08 208/173 |
| 2,719,206 A * | 9/1955 | Gilmore | ................. | B01D 15/02 208/304 |
| 2,738,857 A * | 3/1956 | Drew | ..................... | B01D 53/26 95/111 |
| 2,850,114 A * | 9/1958 | Kehde | .................... | B01D 53/08 502/55 |
| 2,992,895 A * | 7/1961 | Feustel | .................. | B01D 53/34 423/239.1 |
| 3,177,631 A * | 4/1965 | Tamura | .................. | B01D 53/08 48/197 R |

(Continued)

FOREIGN PATENT DOCUMENTS

| RU | 2460573 C2 | 10/2012 |
|---|---|---|
| WO | 2009152366 A2 | 12/2009 |

OTHER PUBLICATIONS

Search Report dated Mar. 24, 2016 for corresponding PCT International Application No. PCT/US2015/065201.

*Primary Examiner* — Frank Lawrence

(57) ABSTRACT

Process for adsorbing a species from a feed gas stream. Feed gas stream is introduced to an adsorption zone having a sorbent. Species from the feed gas stream is adsorbed onto the sorbent at an adsorbing temperature to enrich the sorbent with the species and deplete the species from the feed gas stream. Species-lean product gas stream is output. Species-rich sorbent from the adsorption zone is passed to a regeneration zone. Regenerant gas at a regenerating temperature greater than the adsorbing temperature is introduced into the regeneration zone to strip the species from the species-rich sorbent. Regenerated sorbent from the regeneration zone passes to a cooling zone disposed below the regeneration zone. Regenerated sorbent is cooled at a cooling temperature below the regenerating temperature. Cooled sorbent is transferred to the adsorbent zone.

17 Claims, 1 Drawing Sheet

(56) References Cited

U.S. PATENT DOCUMENTS

| | | | |
|---|---|---|---|
| 3,398,509 A | | 8/1968 | Tamura et al. |
| 3,727,376 A | * | 4/1973 | Szirmay ................. B01D 53/08 95/111 |
| 4,259,094 A | * | 3/1981 | Nagai .................... B01D 53/12 96/123 |
| 4,293,423 A | * | 10/1981 | Kosaka ................ B01J 49/0056 210/177 |
| 4,306,886 A | * | 12/1981 | Clyde .................... B01D 53/08 95/111 |
| 4,319,893 A | * | 3/1982 | Hatch .................... B01D 53/12 95/109 |
| 4,536,197 A | | 8/1985 | Cook |
| 5,336,300 A | * | 8/1994 | Yoshino ................ B01D 53/08 95/106 |
| 5,336,834 A | | 8/1994 | Zarchy et al. |
| 5,705,730 A | | 1/1998 | Zarchy et al. |
| 5,837,636 A | | 11/1998 | Sechrist et al. |
| 5,965,473 A | | 10/1999 | Sechrist et al. |
| 6,117,809 A | | 9/2000 | Sechrist et al. |
| 6,123,833 A | | 9/2000 | Sechrist et al. |
| 6,290,916 B1 | | 9/2001 | Sechrist et al. |
| 6,461,992 B1 | | 10/2002 | Sechrist et al. |
| 6,784,132 B1 | | 8/2004 | Sechrist |
| 6,790,802 B1 | | 9/2004 | Sechrist |
| 6,881,391 B1 | | 4/2005 | Sechrist |
| 7,223,710 B1 | | 5/2007 | Sechrist |
| 7,594,956 B2 | * | 9/2009 | Knaebel ............. B01D 53/0462 95/107 |
| 7,981,272 B2 | | 7/2011 | Dziabis et al. |
| 8,071,497 B2 | | 12/2011 | Yuan et al. |
| 2006/0096850 A1 | | 5/2006 | Kozaki et al. |
| 2011/0083936 A1 | | 4/2011 | Yuan et al. |

* cited by examiner

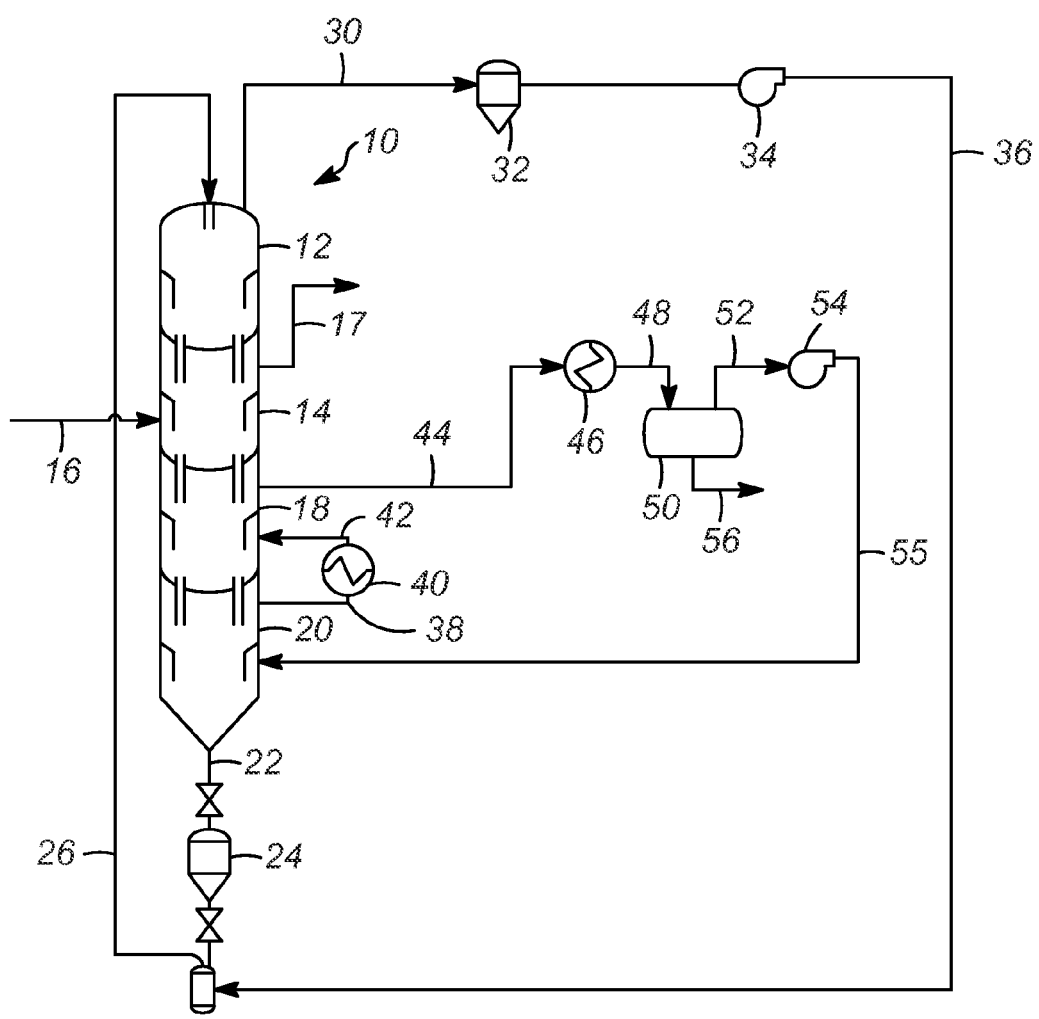

MOVING BED TEMPERATURE SWING ADSORPTION PROCESS

FIELD OF THE INVENTION

This invention relates generally to processes for selective adsorption of species from a gas stream.

BACKGROUND OF THE INVENTION

Adsorption processes are used for separation of a species from a feed gas stream across a broad set of arts including refining, petrochemical processing, natural gas processing, and hydrogen processing. Temperature swing adsorption (TSA) is a known processing technique in which fixed beds of adsorbent are alternated between low and high temperatures. Selective adsorption of species from a feed gas stream occurs at low temperatures. The adsorbent chamber is then isolated and contacted with heated refrigerant to raise the temperature and strip the species from the adsorbent to regenerate the adsorbent bed. The regenerated bed is then cooled prior to starting another cycle of adsorption.

However, current fixed bed TSA processes have certain deficiencies, which affect the efficiency and effectiveness of such processes.

There remains a need for more effective and efficient processes for adsorbing a species from a feed gas stream.

SUMMARY OF THE INVENTION

The present invention is directed to providing effective and efficient processes for adsorbing a species from a feed gas stream.

Accordingly, in one aspect of the present invention, the present invention provides a gas phase adsorption process for adsorbing a species from a feed gas stream. The feed gas stream is introduced to an adsorption zone having a sorbent. The species from the feed gas stream is adsorbed onto the sorbent in the adsorption zone at an adsorbing temperature to enrich the sorbent with the species to provide species-rich sorbent and deplete the species from the feed gas stream to provide a species-lean gas stream. The species-lean product gas stream is output. The species-rich sorbent from the adsorption zone is passed to a regeneration zone disposed below the adsorption zone. A regenerant gas at a regenerating temperature is introduced into the regeneration zone to strip the species from the species-rich sorbent and provide a regenerated sorbent. The regenerating temperature is greater than the adsorbing temperature. The regenerated sorbent from the regeneration zone is passed to a cooling zone disposed below the regeneration zone. The regenerated sorbent is cooled at a cooling temperature that is below the regenerating temperature, and the cooled sorbent is transferred to the adsorbent zone.

In an aspect of some embodiments, the adsorption zone, the regeneration zone, and the cooling zone are disposed within a vessel.

In an aspect of some embodiments, the passing the species-rich sorbent from the adsorption zone to the regeneration zone comprises causing the species-rich sorbent to flow by gravity to the regeneration zone.

In an aspect of some embodiments, the passing the regenerated sorbent from the regeneration zone to the cooling zone comprises causing the regenerated sorbent to flow by gravity to the cooling zone.

In an aspect of some embodiments, transferring the cooled sorbent to the adsorbent zone comprises transferring the cooled sorbent from the cooling zone to a surge zone disposed above the adsorption zone, and causing the cooled sorbent to flow by gravity from the surge zone to the adsorption zone.

In an aspect of some embodiments, transferring comprises controlling a flow of the cooled sorbent from the cooling zone to the surge zone.

In an aspect of some embodiments, transferring further comprises transferring the cooled sorbent via transport by a carrier gas.

In an aspect of some embodiments, the species comprises less than 50% by volume of the feed gas stream.

In an aspect of some embodiments, the process further comprises heating a cooling zone vent gas to the regeneration temperature, and passing the heated cooling zone vent gas to the regeneration zone.

In an aspect of some embodiments, the process further comprises condensing a regeneration zone vent gas, and passing the condensed regeneration zone vent gas to the cooling zone at the cooling temperature.

In an aspect of some embodiments, the process further comprises separating the species from the condensed regeneration vent gas before the passing to the cooling zone.

In an aspect of some embodiments, the feed gas stream comprises a stream taken from the group consisting of hydrocarbon streams, inert gas streams, and aqueous streams.

In an aspect of some embodiments, the sorbent is selected from the group consisting of aluminas and zeolitic materials.

Another aspect of the invention provides a moving bed temperature swing adsorption process for adsorbing a species from a feed gas stream. The feed gas stream is introduced to an adsorption zone having a sorbent. The species from the feed gas stream is adsorbed onto the sorbent in the adsorption zone at an adsorbing temperature to enrich the adsorbent with the species to provide species-rich sorbent and deplete the species from the feed gas stream to provide a species-lean gas stream. The species-lean product gas stream is output. The species-rich sorbent is caused to flow by gravity from the adsorption zone to a regeneration zone disposed below the adsorption zone. A regenerant gas at a regenerating temperature is introduced into the regeneration zone to strip the species from the species-rich sorbent and provide a regenerated sorbent, the regenerating temperature being greater than the adsorbing temperature. The regenerated sorbent from the regeneration zone is caused to flow by gravity to a cooling zone disposed below the regeneration zone. The regenerated sorbent in the cooling zone is cooled at a cooling temperature that is lower than the regenerating temperature. The cooled sorbent is transferred to the adsorbent zone. A cooling zone vent gas is heated to the regenerating temperature, and the heated cooling zone vent gas is passed to the regeneration zone.

In an aspect of some embodiments, the process further comprises outputting a regeneration zone vent gas having a desorbed species as an effluent gas.

In an aspect of some embodiments, the process further comprises outputting a regenerating zone vent gas having a desorbed species, separating the desorbed species from the regeneration zone vent gas to provide a regenerant gas, and recycling the regenerant gas to the cooling zone.

In an aspect of some embodiments, the process further comprises outputting a regenerating zone vent gas having a desorbed species, condensing the regeneration zone vent gas, separating the desorbed species from the condensed regeneration zone vent gas to provide a regenerant gas, and passing the regenerant gas to the cooling zone.

In an aspect of some embodiments, the process further comprises outputting a regenerating zone vent gas having a desorbed species, condensing the regeneration zone vent gas, separating the desorbed species from the condensed regeneration zone vent gas, pressurizing the condensed regeneration vent gas to increase a condensation temperature of the condensed regeneration vent gas; further condensing and further separating the desorbed species from the pressurized regeneration zone vent gas to provide a regenerant gas, and passing the regenerant gas to the cooling zone.

In an aspect of some embodiments, the process further comprises outputting a regenerating zone vent gas having a desorbed species, condensing the regeneration zone vent gas, separating the desorbed species from the condensed regeneration zone vent gas in a liquid-liquid separation to provide a liquid regenerant, vaporizing the liquid regenerant to provide a regenerant gas, and passing the regenerant gas to the cooling zone.

Another aspect of the invention provides a moving bed temperature swing adsorption process for adsorbing a species from a feed gas stream. The feed gas stream is introduced to an adsorption zone having a sorbent, the adsorption zone being disposed within a vessel. The species from the feed gas stream is adsorbed onto the sorbent in the adsorption zone at an adsorbing temperature to enrich the adsorbent with the species to provide species-rich sorbent and deplete the species from the feed gas stream to provide a species-lean gas stream. The species-lean product gas stream is output. The species-rich sorbent is caused to flow by gravity from the adsorption zone to a regeneration zone in the vessel disposed below the adsorption zone. A regenerant gas at a regenerating temperature is introduced into the regeneration zone and the species-rich sorbent is contacted with the regenerant gas to strip the species from the species-rich sorbent and provide a regenerated sorbent, the regenerating temperature being greater than the adsorbing temperature. The regenerated sorbent from the regeneration zone is caused to flow by gravity to a cooling zone disposed in the vessel below the regeneration zone. A cooling gas at a cooling temperature is introduced to cool the regenerated sorbent in the cooling zone, the cooling temperature being lower than the regenerating temperature. The cooled sorbent is transferred to a surge zone disposed in the vessel above the adsorbent zone. The cooled sorbent from the surge zone is caused to flow by gravity to the adsorption zone. A cooling zone vent gas to the regenerating temperature and passing the heated cooling zone vent gas is heated to the regeneration zone to introduce the regenerant gas. A regeneration zone vent gas is output, and at least a portion of the species in the regeneration zone vent gas is condensed. The condensed portion of the species is separated from the regeneration zone vent gas, and the regeneration zone vent gas is passed to the cooling zone at the cooling temperature to introduce the cooling gas.

In yet another aspect of the present invention, a process includes at least two, at least three, or all of the above described aspects of the present invention.

A process including at least one of the above aspects is beneficial and desirable for the reasons described herein.

Additional objects, embodiments, and details of the invention are set forth in the following detailed description of the invention.

BRIEF DESCRIPTION OF THE DRAWING

The drawing is a simplified process flow diagram in which:

The FIGURE shows an example moving bed temperature swing adsorbent (TSA) process for selectively adsorbing species from a feed gas stream.

DETAILED DESCRIPTION OF THE INVENTION

Fixed bed TSA processes have a number of inefficiencies and limitations. For example, adsorbent vessels are heated and cooled repeatedly during the TSA cycle, leading to thermal inefficiencies. Further, the cyclic nature of a TSA fixed bed process leads to inefficient utilization of the adsorbent due to non-active time periods. Such time periods include the time required to heat and cool the fixed bed vessel as well as the purge times to change between adsorption and regeneration.

Additionally, adsorbent vessels are generally switched from low temperature adsorption to high temperature stripping using valve manifolds. This piping and valve arrangement results in low or non-flowing areas, particularly in the regions around closed valves. These areas need to be traced and insulated when processing condensable gases. Preventing condensation can be difficult for high dew point gas streams, particularly around flanges where increased heat losses can lead to localized low temperature areas.

Turning now to the drawings, the FIGURE shows an example moving bed temperature swing adsorbent (TSA) process for selectively adsorbing species from a feed gas stream. An example process is a moving bed TSA gas phase adsorption process employing a vessel 10 having multiple zones in which sorbent continuously flows. An example vessel 10 includes, preferably from top to bottom, a surge zone 12, an adsorption zone 14 where a species from a feed gas stream 16 is selectively adsorbed on the sorbent to provide a product gas stream 17, a regeneration zone 18 for stripping the adsorbed species from the species-rich sorbent, a cooling zone 20, a sorbent outlet 22 with (optional) flow control hopper 24, and a sorbent recycling line 26 for returning sorbent to the surge zone 12 and thus to the adsorption zone 14.

Additional sorbent can be provided via a sorbent feed line (not shown) to the surge zone 12 in surge volumes for maintaining continuous sorbent flow through the adsorption zone 14 and the regeneration zone 18. Sorbent flow control can be provided, for example, by controlling the flow control hopper 24 to selectively introduce sorbent to the sorbent recycling line 26. Additionally or alternatively, a thermal mass flow meter can be provided by providing temperature sensors (not shown) in the surge zone to measure a temperature change between the regeneration zone 18 and the cooling zone 20. This measured temperature change, and knowledge of the heat capacity of the sorbent, can be used to determine (e.g., calculate) thermal mass flow.

The surge zone 12, the adsorption zone 14, the regeneration zone 18, and the cooling zone 20 can be embodied in, for example, a stack of modules that are shop fabricated to optimize quality control of the overall vessel 10 and facilitate installation. Additional zones can be provided, including but not limited to multiple adsorption zones 14 and/or regeneration zones 18. Multiple vessels 10 can be used in example processes, each having one or multiple zones and arranged in series or parallel configuration for particular adsorbing processes.

The feed gas stream 16 is introduced to the adsorption zone 14 having a sorbent. The feed gas stream 16 includes a species to be adsorbed (adsorbed species), which is less than 50% by volume of the feed gas stream. Example feed gas streams including hydrocarbon streams, inert gas streams, aqueous streams, and others. The adsorbed species can include more than one targeted species. Example species to be removed include HCl, water, organic chlorides, and organic flourides. The feed gas stream 16 can be conditioned (not shown) upstream of the adsorption zone 14. Example conditioning includes heating and/or cooling the feed gas stream 16.

The adsorption zone 14 includes a moving bed of adsorbent for contacting the feed gas stream to selectively adsorb the adsorbed species. Example sorbents include catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as the gamma, eta and theta alumina.

Sorbent and catalyst particles are usually spheroidal, having a diameter of from about $\frac{1}{16}$th to about $\frac{1}{8}$th inch (1.5-3.1 mm), though they may be as large as $\frac{1}{4}$th inch (6.35 mm). Other example sorbents include aluminas and zeolitic materials.

In the adsorption zone 14, the species from the feed gas stream 16 is selectively adsorbed onto the sorbent in the moving bed at an adsorbing temperature. A cooler (not shown) may be in communication with the feed gas stream 16 to cool the feed gas stream to the adsorbing temperature. In some example processes, the feed gas stream 16 may be heated to a somewhat superheat feed to prevent condensation of the feed stream.

In the adsorption zone 12, the sorbent is enriched with the species to provide species-rich sorbent, and the species from the feed gas stream 16 is depleted to provide a species-lean product stream. This species-lean product stream is output via product gas stream line 17 for further processing, venting to atmosphere, for or other use. The species-lean product stream can also be considered species-rich in a species from the feed gas stream 16 other than the adsorbed species.

To regenerate the species-rich sorbent, the species-rich sorbent is caused to pass, preferably via gravity, from the adsorption zone 14 to the regeneration zone 18 that is disposed below the adsorption zone. As used herein, "caused" refers to allowing a sorbent to flow actively or passively, e.g., by gravity, and/or refers to selectively allowing all or a portion of sorbent to be passed (by gravity or other methods) to another zone, e.g., by selectively delivering an amount of sorbent to another zone. As a non-limiting example, a flow control hopper (e.g., lock hopper) can be used to selectively allow all or a portion of sorbent to be passed to another zone. As another non-limiting example, the sorbent can be permitted to flow by gravity between progressively lower zones via sorbent transfer pipes.

In the regeneration zone 18, a regenerant gas is introduced via regenerant gas input line 42 at a regenerating temperature. The regenerating temperature is greater than the adsorbing temperature in the adsorption zone 14. The species-rich sorbent is contacted with the regenerant gas to strip the adsorbed species from the sorbent, providing a regenerated sorbent, and enriching a regeneration vent gas with the desorbed species.

The regenerated sorbent then is passed, preferably by gravity, to the cooling zone 20, where a cooling gas is introduced (e.g., via a cooling gas input line 55) at a cooling temperature. The cooling temperature is below the regenerating temperature. Cooled sorbent is passed, preferably by gravity, from the cooling zone 20 to the sorbent output 22 and to the flow control hopper 24. The cooled sorbent is then transferred (preferably using one or more flow control methods) via the sorbent recycling line 26 to the surge zone 12, where the sorbent passes, again preferably by gravity, to the adsorption zone 14 to complete the sorbent cycle. The flow control hopper 24 or another flow control device coupled to the sorbent recycling line 26 or to the surge zone 12 allows selective delivery of recycled sorbent as a surge volume to the surge zone to maintain a controlled flow of sorbent through the vessel 10 for the example moving bed TSA process.

To provide the (heated) regenerant gas in the regeneration zone 18, vent gas from the cooling zone 20 is vented via cooling gas vent line 38 and is heated in regenerant gas heater 40 to the regenerating temperature to provide the (heated) regenerant gas. The heated regenerant gas is passed to the regeneration zone 18 along regenerant gas input line 42.

The regeneration vent gas output from the regeneration zone 18, e.g., via regeneration zone vent gas output line 44, can be vented, processed, and/or recycled according to example methods. For example, in some processes the regeneration vent gas having the desorbed species can be output as an effluent gas (not shown). In other example processes, the desorbed species can be separated from the regeneration vent gas output, and the regenerant gas recycled to the cooling zone 20. For example, the regeneration vent gas output line 44 can pass the regeneration vent gas to a regenerant recovery zone to separate desorbed species and recover regenerant gas. A regenerant recovery zone can include condensers, compressors, desorbed species separators (e.g., liquid-gas, liquid-liquid, etc.), vaporizers, or other components, examples of which are provided herein. Recovered regenerant gas can be delivered to the cooling zone 20 via a regenerant gas supply line, e.g., cooling gas input line 55. The desorbed species can be output from the regenerant recovery zone via a suitable output line.

In the process shown in the FIGURE, to provide the cooling gas, vent gas from the regeneration zone 18 is vented via regeneration vent gas output line 44 to a regeneration vent gas condenser 46, where at least a portion of the desorbed species is condensed from the regenerant gas and the regeneration vent gas is cooled to the cooling temperature. The regeneration vent gas is passed via line 48 to a separator 50 for separating the condensed desorbed species from the regenerant gas. In this example, the regeneration vent gas condenser 46 and the separator 50 can provide components of a regenerant recovery zone. A separator output line 52 delivers the regenerant gas, with at least some of the desorbed species removed, to a compressor 54 to pressurize the regenerant gas. The pressurized regenerant gas is passed to the cooling zone 20 via cooling gas input line 55. The separated desorbed species is output from the separator 50 via desorbed species output line 56. In the process shown in the FIGURE or in other example processes disclosed herein, a regenerant makeup line (not shown) can be provided for supplying makeup regenerant gas to the regeneration zone 18. For example, the regenerant makeup line (not shown) can be provided upstream of regenerant gas heater 40 (e.g., coupled to line 38), or may be located elsewhere as will be appreciated by those of ordinary skill in the art.

Another alternative example process is similar to the process shown in the FIGURE, but the cooling gas input line 55 downstream of the compressor 54 (which increases the condensation temperature of the condensed regeneration zone vent gas) includes an additional condenser and an additional desorbed species separator (not shown) for further condensing and further separating additional desorbed species from the (pressurized) regeneration vent gas. The desorbed species can be output from the separator via an additional desorbed species output line (not shown). The regenerant gas is then passed to the cooling zone 20.

In another alternative example process, the regeneration vent gas condenser 46 condenses both the regenerant gas and the desorbed species to liquid. The separator 50 is a liquid-liquid separator that separates the liquid desorbed species from the (liquid) regenerant. The liquid desorbed species is output, e.g., via desorbed species output line 56. The liquid regenerant is pumped via a regenerant pump (not shown) in place of the regenerant compressor 54, and vaporized in a regenerant vaporizer (not shown) disposed along the cooling gas input line 55 to provide the regenerant gas. The regenerant gas is then delivered to the cooling zone 20 via the cooling gas input line 55. As another alternative, the regeneration vent gas condenser 46 condenses the regenerant gas, and the separator 50 separates the (liquid) regenerant gas from the (gas) desorbed species. The liquid regenerant is pumped and vaporized to provide the regenerant gas.

In the process shown in the FIGURE, the regenerant gas and the cooling gas continuously flow throughout the process, as does the sorbent. A process gas (lift gas) preferably also flows continuously through the vessel 10 during this example process or other processes provided herein. For example, vent gas from the adsorption zone 14 is passed, e.g., through the surge zone 12, via a vent gas line 30 to a lift gas system. The lift gas system includes a dust collector 32, where dust from the surge zone (e.g., from solid sorbent particles) is collected. After dust collection, the vent gas passes through a lift gas blower 34, and is delivered to the vessel 10 via process gas input line 36.

The process gas preferably is also supplied to the sorbent recycling line 26 as a carrier gas for transferring sorbent to the top of the vessel 10 (e.g., to the surge zone 12). Sorbent transfer between the surge zone 12, the adsorption zone 14, the regeneration zone 18, and the cooling zone 20 can be by gravity through discrete pipes (e.g., sorbent transfer pipes) or annular zones to restrict the amount of gas transfer between the zones.

In an example process, counter-current gas-sorbent contacting takes place in the adsorption and the regeneration zones 14, 18. This can maximize heat and mass transfer driving force. Alternatively, an example process can employ radial gas flow and downflow sorbent contacting to reduce a bed depth and the resulting pressure drop.

In some example processes, other zones could be integrated to condition the sorbent as required for a specific application. Example additional zones include drying zones. Also, in some example processes, a pressure profile can be adjusted between the surge zone 12, the adsorption zone 14, the regeneration zone 18, the cooling zone 20, or any additional zones in the vessel 10 or in an overall system for various benefits. For example, by allowing relative small purge gas flows across sorbent transfer pipes between zones, the adsorption zone 14 can be effectively sealed. This can be beneficial to, for instance, prevent condensation in sorbent transfer pipes.

Providing a continuous flow of sorbent, as well as regenerant gas and/or process gas in some example moving bed TSA processes, can improve effective utilization of the sorbent compared to conventional swing bed adsorption processes. For example, the alternating heating-cooling cycle of a vessel in conventional processes can be eliminated. Cyclic variations in output stream composition and temperature can be reduced or eliminated.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A gas phase adsorption process for adsorbing a species from a feed gas stream, the process comprising:
   introducing the feed gas stream to an adsorption zone having a sorbent;
   adsorbing the species from the feed gas stream onto the sorbent in the adsorption zone at an adsorbing temperature to enrich the sorbent with the species to provide species-rich sorbent and deplete the species from the feed gas stream to provide a species-lean gas stream;
   outputting the species-lean product gas stream;
   passing the species-rich sorbent from the adsorption zone to a regeneration zone disposed below the adsorption zone;
   introducing a regenerant gas at a regenerating temperature into the regeneration zone to strip the species from the species-rich sorbent and provide a regenerated sorbent, the regenerating temperature being greater than the adsorbing temperature;
   passing the regenerated sorbent from the regeneration zone to a cooling zone disposed below the regeneration zone;
   cooling the regenerated sorbent at a cooling temperature that is below the regenerating temperature;
   transferring the cooled sorbent to the adsorption zone;
   heating a cooling zone vent gas to the regenerating temperature and passing the heated cooling zone vent gas to the regeneration zone;
   condensing a regeneration zone vent gas; and
   passing the condensed regeneration zone vent gas to the cooling zone at the cooling temperature.

2. The process of claim 1, wherein the adsorption zone, the regeneration zone, and the cooling zone are disposed within a vessel.

3. The process of claim 1, wherein said passing the species-rich sorbent from the adsorption zone to the regeneration zone comprises causing the species-rich sorbent to flow by gravity to the regeneration zone.

4. The process of claim 3, wherein said passing the regenerated sorbent from the regeneration zone to the cooling zone comprises causing the regenerated sorbent to flow by gravity to the cooling zone.

5. The process of claim 1, wherein said transferring the cooled sorbent to the adsorbent zone comprises transferring the cooled sorbent from the cooling zone to a surge zone disposed above the adsorption zone; and
causing the cooled sorbent to flow by gravity from the surge zone to the adsorption zone.

6. The process of claim 5, wherein said transferring comprises:
controlling a flow of the cooled sorbent from the cooling zone to the surge zone.

7. The process of claim 5, wherein said transferring further comprises transferring the cooled sorbent via transport by a carrier gas.

8. The process of claim 1, wherein the species comprises less than 50% by volume of the feed gas stream.

9. The process of claim 1, further comprising:
separating the species from the condensed regeneration vent gas before said passing to the cooling zone.

10. The process of claim 1, wherein the feed gas stream comprises a stream taken from the group consisting of hydrocarbon streams, inert gas streams, and aqueous streams.

11. The process of claim 1, wherein the sorbent is selected from the group consisting of aluminas and zeolitic materials.

12. A temperature swing adsorption process for adsorbing a species from a feed gas stream, the process comprising:
introducing the feed gas stream to an adsorption zone having a sorbent;
adsorbing the species from the feed gas stream onto the sorbent in the adsorption zone at an adsorbing temperature to enrich the adsorbent with the species to provide species-rich sorbent and deplete the species from the feed gas stream to provide a species-lean gas stream;
outputting the species-lean product gas stream;
causing the species-rich sorbent to flow by gravity from the adsorption zone to a regeneration zone disposed below the adsorption zone;
introducing a regenerant gas at a regenerating temperature into the regeneration zone to strip the species from the species-rich sorbent and provide a regenerated sorbent, the regenerating temperature being greater than the adsorbing temperature;
causing the regenerated sorbent from the regeneration zone to flow by gravity to a cooling zone disposed below the regeneration zone;
cooling the regenerated sorbent in the cooling zone at a cooling temperature that is lower than the regenerating temperature;
transferring the cooled sorbent to the adsorbent zone;
heating a cooling zone vent gas to the regenerating temperature and passing the heated cooling zone vent gas to the regeneration zone;
outputting a regenerating zone vent gas having a desorbed species;
separating the desorbed species from the regeneration zone vent gas to provide a regenerant gas; and
recycling the regenerant gas to the cooling zone.

13. The process of claim 12, further comprising:
outputting a regeneration zone vent gas having a desorbed species as an effluent gas.

14. The process of claim 12, further comprising:
condensing at least a portion of the desorbed species in the regeneration zone vent gas before the separating the portion of the desorbed species from the regeneration zone vent gas to provide the regenerant gas.

15. The process of claim 12, further comprising:
condensing the regeneration zone vent gas before the separating the desorbed species from the condensed regeneration zone vent gas;
pressurizing the condensed regeneration vent gas to increase a condensation temperature of the condensed regeneration vent gas;
further condensing and further separating the desorbed species from the pressurized regeneration zone vent gas to provide the regenerant.

16. The process of claim 12, further comprising:
condensing the regeneration zone vent gas before the separating the desorbed species from the regeneration zone vent gas; wherein the separation is a liquid-liquid separation to provide a liquid regenerant; and
vaporizing the liquid regenerant to provide the regenerant gas.

17. A moving bed temperature swing adsorption process for adsorbing a species from a feed gas stream, the process comprising:
introducing the feed gas stream to an adsorption zone having a sorbent, the adsorption zone being disposed within a vessel;
adsorbing the species from the feed gas stream onto the sorbent in the adsorption zone at an adsorbing temperature to enrich the adsorbent with the species to provide species-rich sorbent and deplete the species from the feed gas stream to provide a species-lean gas stream;
outputting the species-lean product gas stream;
causing the species-rich sorbent to flow by gravity from the adsorption zone to a regeneration zone in the vessel disposed below the adsorption zone;
introducing a regenerant gas at a regenerating temperature into the regeneration zone and contacting the species-rich sorbent with the regenerant gas to strip the species from the species-rich sorbent and provide a regenerated sorbent, the regenerating temperature being greater than the adsorbing temperature;
causing the regenerated sorbent from the regeneration zone to flow by gravity to a cooling zone disposed in the vessel below the regeneration zone;
introducing a cooling gas at a cooling temperature to cool the regenerated sorbent in the cooling zone, the cooling temperature being lower than the regenerating temperature;
transferring the cooled sorbent to a surge zone disposed in the vessel above the adsorbent zone;
causing the cooled sorbent from the surge zone to flow by gravity to the adsorption zone;
heating a cooling zone vent gas to the regenerating temperature and passing the heated cooling zone vent gas to the regeneration zone to introduce the regenerant gas;
outputting a regeneration zone vent gas;
condensing at least a portion of the species in the output regeneration zone vent gas;
separating the condensed portion of the species from the regeneration zone vent gas; and
passing the regeneration zone vent gas to the cooling zone at the cooling temperature to introduce the cooling gas.

* * * * *